(12) United States Patent
Hagiwara (10) Patent No.: US 6,625,125 B1
(45) Date of Patent: Sep. 23, 2003

(54) METHOD AND DEVICE FOR MEASURING FIELD STRENGTH OF RECEIVED SIGNAL IN TIME-DIVISION MULTIPLE ACCESS

(75) Inventor: Yasunori Hagiwara, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/335,396

(22) Filed: Jun. 17, 1999

(30) Foreign Application Priority Data

Jun. 19, 1998 (JP) .......................................... 10-172453

(51) Int. Cl.⁷ ............................................ G01R 31/08
(52) U.S. Cl. ....................... 370/251; 370/337; 370/347; 370/436; 370/442; 370/458; 455/226.1; 455/226.2; 455/234.1
(58) Field of Search ................................ 370/251, 321, 370/337, 347, 436, 442, 458; 455/226.1, 226.2, 234.1

(56) References Cited

U.S. PATENT DOCUMENTS

| 5,410,733 | A |   | 4/1995  | Niva et al.      |         |
|-----------|---|---|---------|------------------|---------|
| 5,561,673 | A | * | 10/1996 | Takai et al.     | 714/708 |
| 5,606,729 | A |   | 2/1997  | D'Amico et al.   |         |
| 5,668,813 | A | * | 9/1997  | Malek et al.     | 370/514 |
| 5,748,621 | A | * | 5/1998  | Masuda et al.    | 370/337 |
| 5,781,570 | A | * | 7/1998  | Hattori          | 714/807 |
| 5,822,313 | A | * | 10/1998 | Malek et al.     | 370/332 |
| 5,825,817 | A |   | 10/1998 | Tanaka et al.    |         |
| 5,933,053 | A | * | 8/1999  | Iemura           | 329/311 |
| 5,995,492 | A | * | 11/1999 | Klein et al.     | 370/280 |
| 6,006,089 | A | * | 12/1999 | Sasaki et al.    | 455/423 |
| 6,016,430 | A | * | 1/2000  | Shinomiya        | 455/515 |
| 6,236,860 | B1| * | 5/2001  | Hagting et al.   | 455/436 |
| 6,256,477 | B1| * | 7/2001  | Eidson et al.    | 455/63  |
| 6,272,335 | B1| * | 8/2001  | Nakayama et al.  | 455/422 |
| 6,356,745 | B1| * | 3/2002  | Lee et al.       | 455/232.1 |
| 6,360,088 | B1| * | 3/2002  | Shi et al.       | 455/277.1 |
| 6,397,090 | B1| * | 5/2002  | Cho              | 455/574 |
| 6,400,734 | B1| * | 6/2002  | Weigand          | 370/514 |
| 6,483,884 | B1| * | 11/2002 | Shen et al.      | 375/347 |
| 6,515,982 | B1| * | 2/2003  | Hagiwara         | 370/347 |
| 6,516,285 | B1| * | 2/2003  | Hori et al.      | 702/150 |

FOREIGN PATENT DOCUMENTS

| EP | 0 722 226 | 7/1996 |
| EP | 0 755 133 | 1/1997 |
| JP | 6-120888 | 4/1994 |
| JP | 7-327003 | 12/1995 |
| JP | 8-88596 | 4/1996 |
| JP | 9-247075 | 11/1997 |
| JP | 9-321686 | 12/1997 |

* cited by examiner

Primary Examiner—Douglas Olms
Assistant Examiner—Van Nguyen
(74) Attorney, Agent, or Firm—Merchant & Gould P.C.

(57) ABSTRACT

Based on the results of the detection of a unique word in a received signal with a unique word detecting portion and the detection of a correct CRC in a received signal with a CRC calculating portion, a microprocessor portion sends a reset signal to a timer portion. The reset signal resets the timer of the timer portion, and causes the timer portion to send a field strength measurement timing signal to a field strength measuring portion. The timer portion then automatically keeps track of the data slot timing and outputs the field strength measurement timing signal at every cycle of desired timeslot. Thus, the reliability of measuring the field strength of received radio wave for the desired station in a time-division multiple access can be improved, even if there is interference from other stations.

10 Claims, 12 Drawing Sheets

METHOD AND DEVICE FOR MEASURING FIELD STRENGTH OF RECEIVED SIGNAL IN TIME-DIVISION MULTIPLE ACCESS

BACKGROUND OF THE INVENTION

1. Field of the Invention

The present invention relates to a method for measuring the field strength of received signals in a time-division multiple access radio communication system, and a time-division multiple access radio communication device using the same.

2. Description of the Prior Art

In recent years, the continuing development of radio communication technology has brought many terminals to the market that use time-division multiple access radio communication system (hereinafter referred to as time-division multiple access). In conventional methods for measuring the field strength of signals received with a time-division multiple access, a measurement is performed for a certain period of time while receiving a signal at the station, and the average value is regarded as the received field strength.

Figure 13:
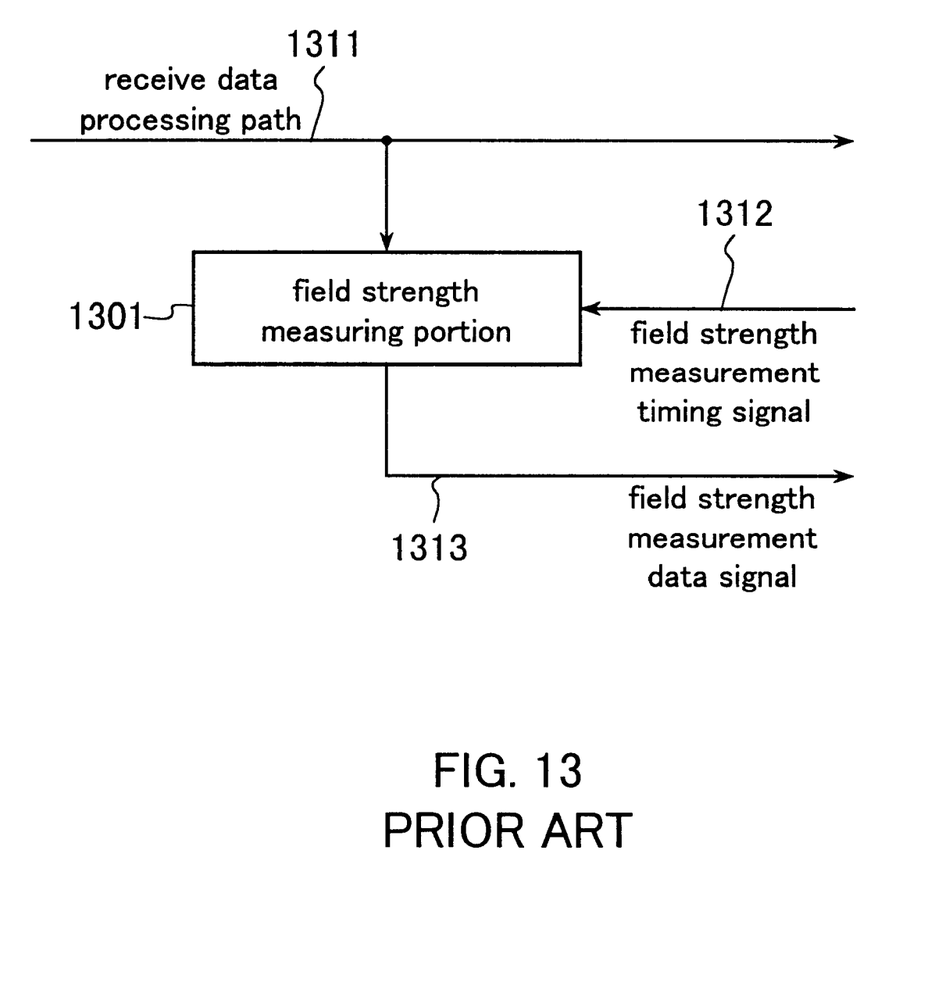
FIG. 13 is a block diagram illustrating an example of prior art.
Figure 14:
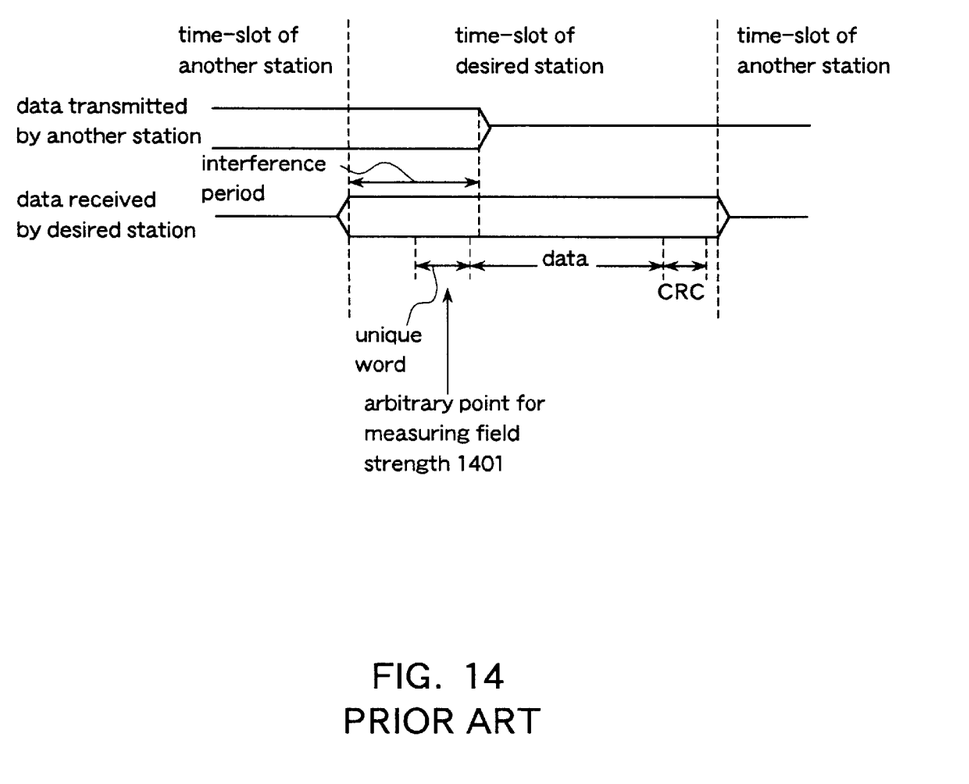
FIG. 14 is a timing chart showing an example of how data transmitted from another station interferes during the time-slot for the desired station.

The following is an explanation of a conventional method for measuring the field strength of received signals in a time-division multiple access, with reference to FIGS. 13 and 14.

In the block diagram of FIG. 13, received data is input from a received data processing path 1311 into a field strength measuring portion 1301. The field strength measuring portion 1301 measures field strengths in accordance with an external field strength measurement timing signal 1312, and outputs field strength measurement data 1313. In the timing chart in FIG. 14, a point for measuring field strength 1401 at which the field strength of the received signal is measured is decided arbitrarily within the receiving time slot of a desired station, the measurement is performed over a certain period of time starting with the timing of the field strength measurement timing signal 1312 in FIG. 13, and thus the field strength of the received signal is determined.

However, a large number of devices using this time-division multiple access leads to interference of radio waves of other stations during the time-slot for the desired station, as shown in FIG. 14. When other stations interfere during the time-slot for a certain station in conventional methods for measuring the field strength of signals received with a time-division multiple access, the field strength of signals received by the desired station cannot be measured, and the reliability of the radio communication declines.

SUMMARY OF THE INVENTION

It is an object of this invention to solve these problems, and provide a method and a device that can measure the field strength of received signals correctly, even when there is interference from other stations during the time-slot for the station employing the method.

In order to achieve these objects, the field strength of received signals are measured automatically at times when there is no interference from other stations, which is the result of a unique word detection, CRC matching or arbitrary timing with a timer.

In the following description, embodiments of the invention are directed to methods and devices for measuring field strengths of a received signal in a time-division multiple access, wherein the signal is affected by interference from other stations using the same frequency carrier wave.

According to an embodiment of this invention, a method for measuring field strength of a received signal includes the following steps: (i) detecting a unique word for a desired station in the received signal; and (ii) measuring the field strength of the received signal at a time when the unique word is detected by the detecting step (i).

According to another embodiment of this invention, the method includes the following steps: (i) ascertaining the consistency of data of the received signal by calculating and evaluating CRC in the received signal; and (ii) measuring the field strength at a time when the consistency of data has been ascertained by the ascertaining step (i).

According to a further embodiment of this invention, the method includes the following steps: (i) continuously timing a lapse of a period corresponding to an interval of time-slots for a desired station by a timer, which outputs a signal at every lapse of the period; (ii) resetting the timer to restart the timing at an arbitrary time while data is received during the time-slot for the desired station; (iii) measuring the field strength of the received signal at the time when the resetting step is performed; and (iv) repeating the measurement of the field strength of the received signal at every cycle of the time-slot, points of time for the measurement being determined in response to the output signal of the timer.

According to a further embodiment of this invention, the method includes the following steps: (i) detecting a unique word for a desired station in the received signal; (ii) ascertaining the consistency of data of the received signal by calculating and evaluating CRC in the received signal; (iii) continuously timing a lapse of a period corresponding to an interval of time-slots for a desired station by a timer, which outputs a signal at every lapse of the period; (iv) determining a time for resetting the timer, based on the result of the detecting step and the ascertaining step; (v) resetting the timer to restart the timing at the time determined by the determining step; (vi) measuring the field strength of the received signal at the time when the resetting step is performed; and (vii) repeating the measurement of the field strength of the received signal at every cycle of the time-slot, points of time for the measurement being determined in response to the output signal of the timer.

According to a further embodiment of this invention, a device for measuring field strength of a received signal includes: (i) unique word detecting means for detecting a unique word for a desired station in the received signal; and (ii) field strength measuring means for measuring the field strength of the received signal at a time when said unique word has been detected by said unique word detecting means.

According to a further embodiment of this invention, the device includes: (i) CRC calculating means for ascertaining the consistency of data of the received signal by calculating and evaluating CRC in the received signal; and (ii) field strength measuring means for measuring the field strength of the received signal at a time when the consistency of data has been ascertained by said CRC calculating means.

According to a further embodiment of this invention, the device includes: (i) a timer for continuously timing a lapse of a period corresponding to an interval of time-slots for a desired station, the timer outputting a signal at every lapse of the period; (ii) resetting means for resetting the timer to restart the timing at an arbitrary time while data is received during a time-slot for desired station; and (iii) field strength measuring means for measuring the field strength of the received signal at the time when the resetting step is performed, the measurement being repeated at every cycle of the time-slot, points of time for the repeating measurement being determined in response to the output signal of the timer.

According to a further embodiment of this invention, the device includes: (i) unique word detecting means for detecting a unique word for a desired station in the received signal; (ii) CRC calculating means for ascertaining consistency of data of the received signal by calculating and evaluating CRC in the received signal; (iii) a timer for continuously timing a lapse of a period corresponding to an interval of time-slots for a desired station, the timer outputting a signal at every lapse of the period; (iv) a microprocessor for resetting the timer to restart the timing at a time determined on the basis of the output signal of the unique word detecting means and the CRC calculating means; and (v) field strength measuring means for measuring the field strength of the received signal at the time when the resetting step is performed, the measurement being repeated at every cycle of the time-slot, points of time for the repeating measurement being determined in response to the output signal of the timer.

According to a further embodiment of this invention, a receiving device for time-division multiple access includes the device according to one of the above-mentioned embodiments; and data buffer means.

According to a further embodiment of this invention, a mobile communication terminal includes the receiving device as mentioned above.

According to a further embodiment of this invention, a mobile communication base-station includes the receiving device as mentioned above.

DESCRIPTION OF THE PREFERRED EMBODIMENTS

First Embodiment

Figure 1:
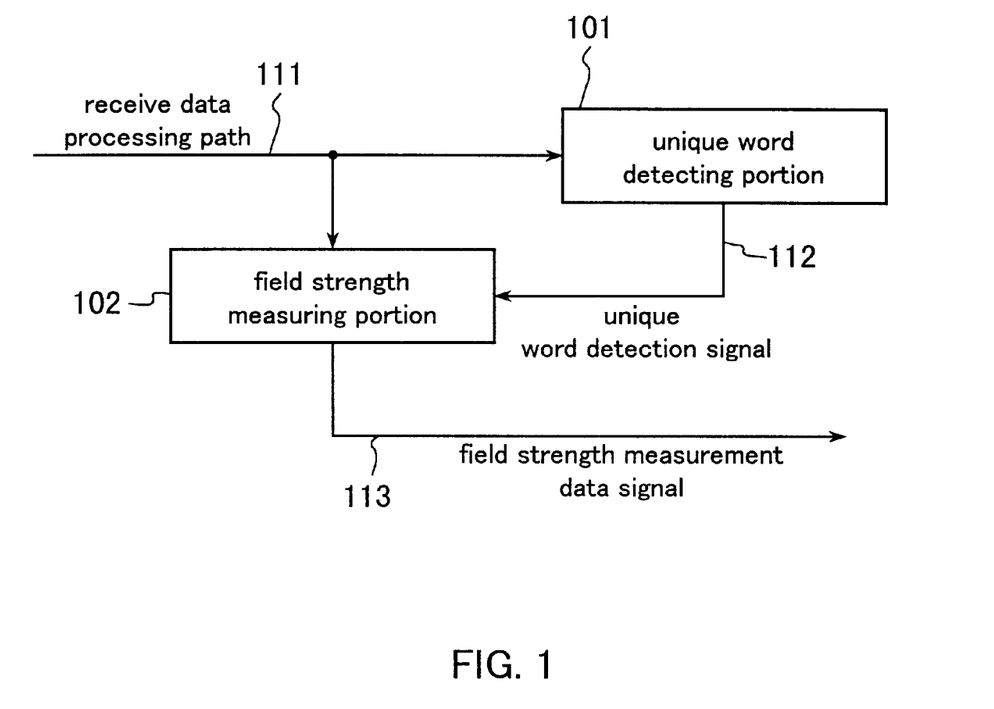
FIG. 1 is a block diagram illustrating a first embodiment of the present invention.
Figure 2:
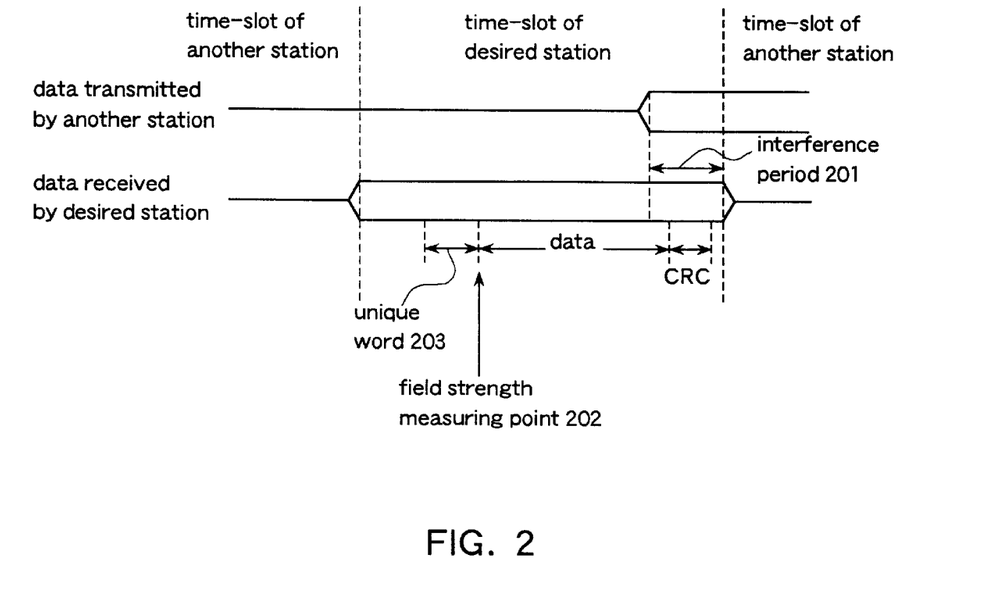
FIG. 2 is a timing chart showing an example of how data transmitted from another station interferes during the time-slot for a desired station.
Figure 3:
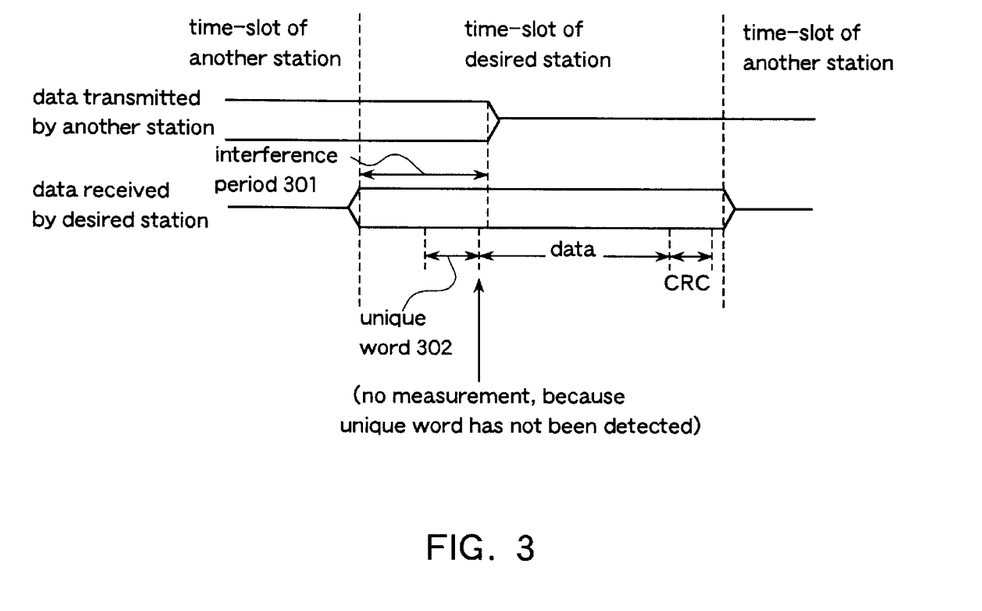
FIG. 3 is a timing chart showing another example of how data transmitted from another station interferes during the time-slot for the desired station.

FIG. 1 shows the configuration of a method for measuring the field strength of a received signal in time-division multiple access, in accordance with a first embodiment of the present invention. FIG. 2 shows an example of how the data sent from another station interferes during the time-slot for a desired station. FIG. 3 shows another example of how the data sent from another station interferes during the time-slot for the desired station. In FIG. 1, numeral 101 denotes a unique word detecting portion, numeral 102 denotes a field strength measuring portion, numeral 111 denotes a receive data processing path, numeral 112 denotes a unique word detection signal, and numeral 113 denotes a field strength measurement data signal.

The unique word detecting portion 101 can be composed of, for example, a shift register storing a unique word and a comparator. The field strength measuring portion 102 can be composed of an analog voltage measurement device using an A/D converter. However, there is no particular limitation to their configurations, and other configurations are possible.

In FIG. 2, numeral 201 denotes an interference period, numeral 202 denotes the time when the field strength of the received signal is measured, and numeral 203 denotes the unique word allocated to the desired station. In FIG. 3, numeral 301 denotes an interference period, and numeral 302 denotes the unique word allocated to the desired station.

The received signal is passed over the receive data processing path 111 into the unique word detecting portion 101 and the field strength measuring portion 102. When the unique word detecting portion 101 detects a unique word in the received data, it gives out the unique word detection signal 112 and notifies the field strength measuring portion 102 of the timing for measuring the field strength. The field strength measuring portion 102 measures the field strength of the received signal at the time when it receives the unique word detection signal 112, and outputs the field strength measurement data signal 113.

With this embodiment, even when there is an interference period 201 due to the interfering wave from another station as in FIG. 2, the field strength of the received data allocated to the desired station can be measured correctly, because the field strength of the received data is measured at a field strength measuring point 202, directly after the unique word 203 allocated to the desired station has been detected. Furthermore, if there is an interference period 301 due to an interfering wave from another station as in FIG. 3, the unique word detection signal 112 is not generated, because, due to the interference from the other station, the unique word 302 allocated to the desired station is not detected. Therefore, faulty field strength measurements due to interference from other stations can be avoided, because in this case the field strength of the received data is not measured.

Second Embodiment

Figure 4:
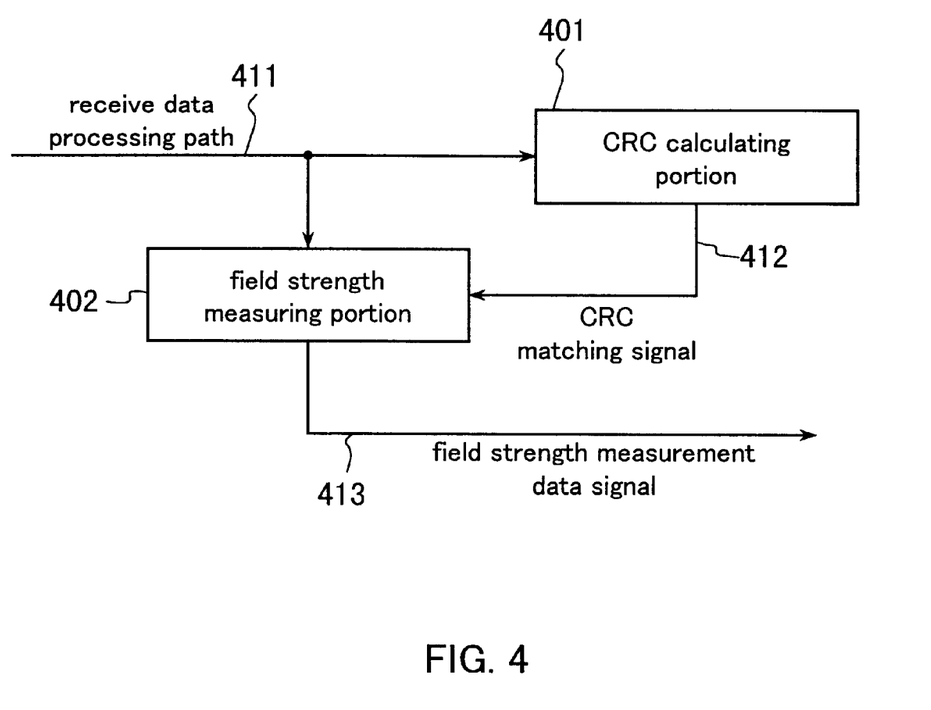
FIG. 4 is a block diagram illustrating a second embodiment of the present invention.
Figure 5:
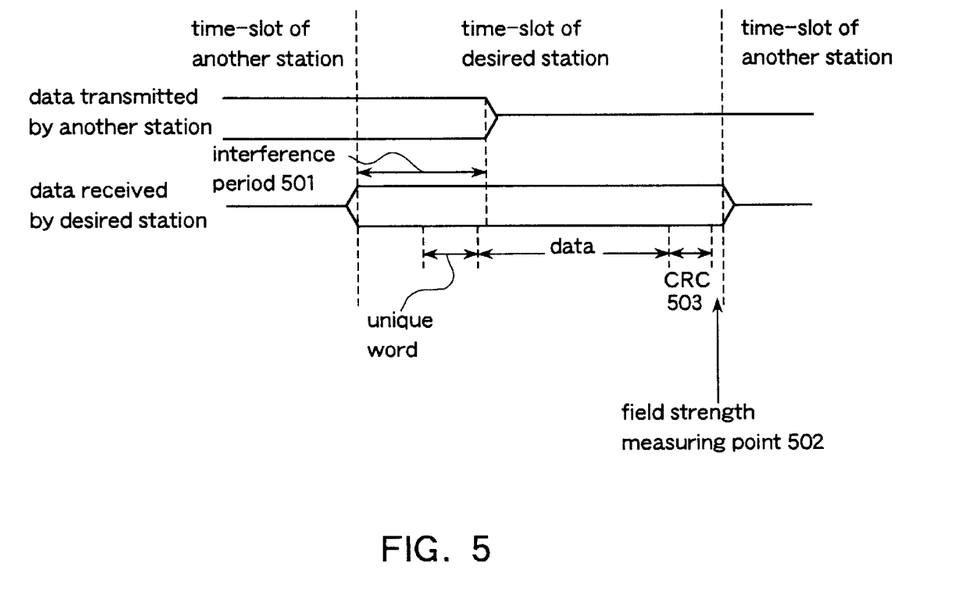
FIG. 5 is a timing chart showing an example of how data transmitted from another station interferes during the time-slot for the desired station.
Figure 6:
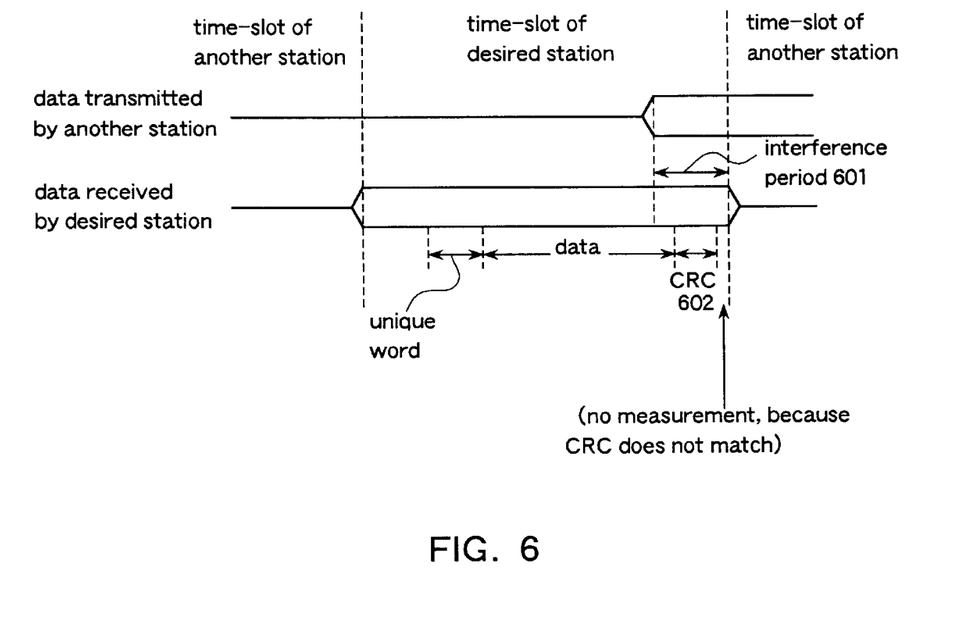
FIG. 6 is a timing chart showing another example of how data transmitted from another station interferes during the time-slot for the desired station.

FIG. 4 shows the configuration of a method for measuring the field strength of a received signal in time-division multiple access, in accordance with a second embodiment of the present invention. FIG. 5 shows an example of how the data sent from another station interferes during the time-slot for the desired station. FIG. 6 shows another example of how the data sent from another station interferes during the time-slot for the desired station. In FIG. 4, numeral 401 denotes a CRC calculating portion, numeral 402 denotes a field strength measuring portion, numeral 411 denotes a receive data processing path, numeral 412 denotes a CRC matching signal, and numeral 413 denotes a field strength measurement data signal. In FIG. 5, numeral 501 denotes an interference period, numeral 502 denotes the time when the field strength of the received signal is measured, and numeral 503 denotes the CRC allocated to the desired station. In FIG. 6, numeral 601 denotes an interference period, and numeral 602 denotes the CRC allocated to the desired station.

The received signal is passed over the receive data processing path 411 into the CRC calculating portion 401 and the field strength measuring portion 402. When the CRC calculating portion 401 detects a CRC in the received data, it ascertains the consistency of data. That is, the CRC calculating portion 401 compares the internally calculated CRC with the CRC of the received data, and, if the two match, gives out the CRC matching signal 412 to notify the field strength measuring portion 402 of the timing for measuring the field strength. The field strength measuring portion 402 measures the field strength of the received signal at the time when it receives the CRC matching signal 412, and outputs the field strength measurement data signal 413.

With this embodiment, even when there is an interference period 501 due to the interfering wave from another station as in FIG. 5, the field strength of the received data allocated to the desired station can be measured correctly, because the field strength of the received data is measured at a field strength measuring point 502, directly after the CRC 503 allocated to the desired station has been detected. Furthermore, if there is an interference period 601 due to the interfering wave from another station as in FIG. 6, the CRC matching signal 412 is not generated, because, due to the interference from the other station, the CRC 602 allocated to the desired station is not detected. Therefore, faulty field strength measurements due to interference from other stations can be avoided, as in this case the field strength of the received data is not measured.

Third Embodiment

Figure 7:
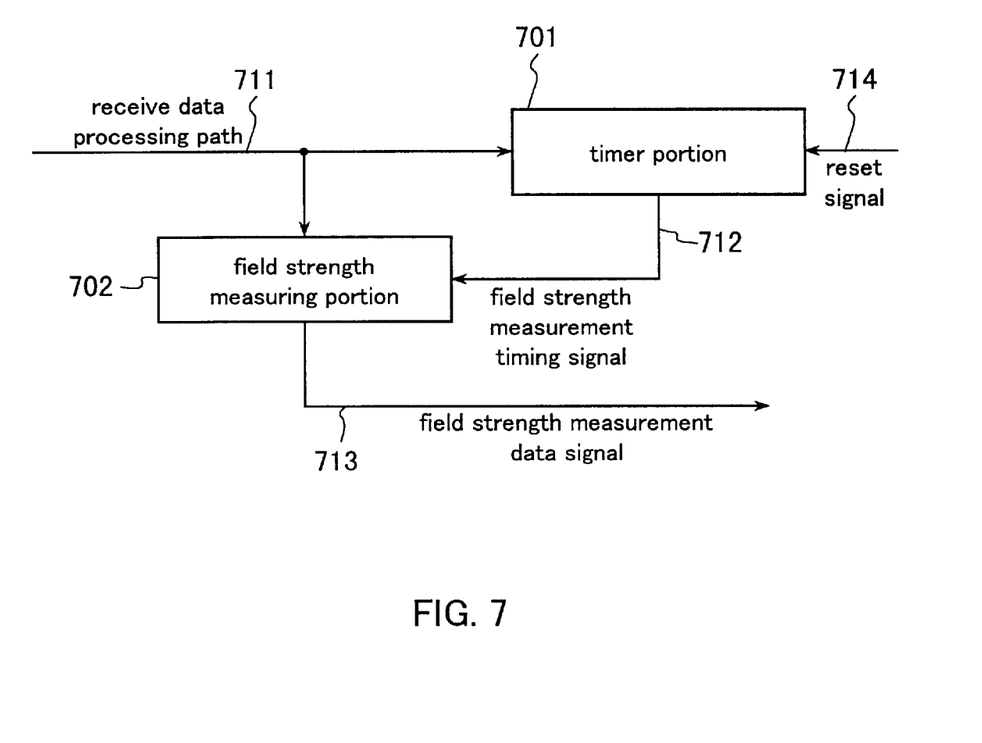
FIG. 7 is a block diagram illustrating a third embodiment of the present invention.
Figure 8:
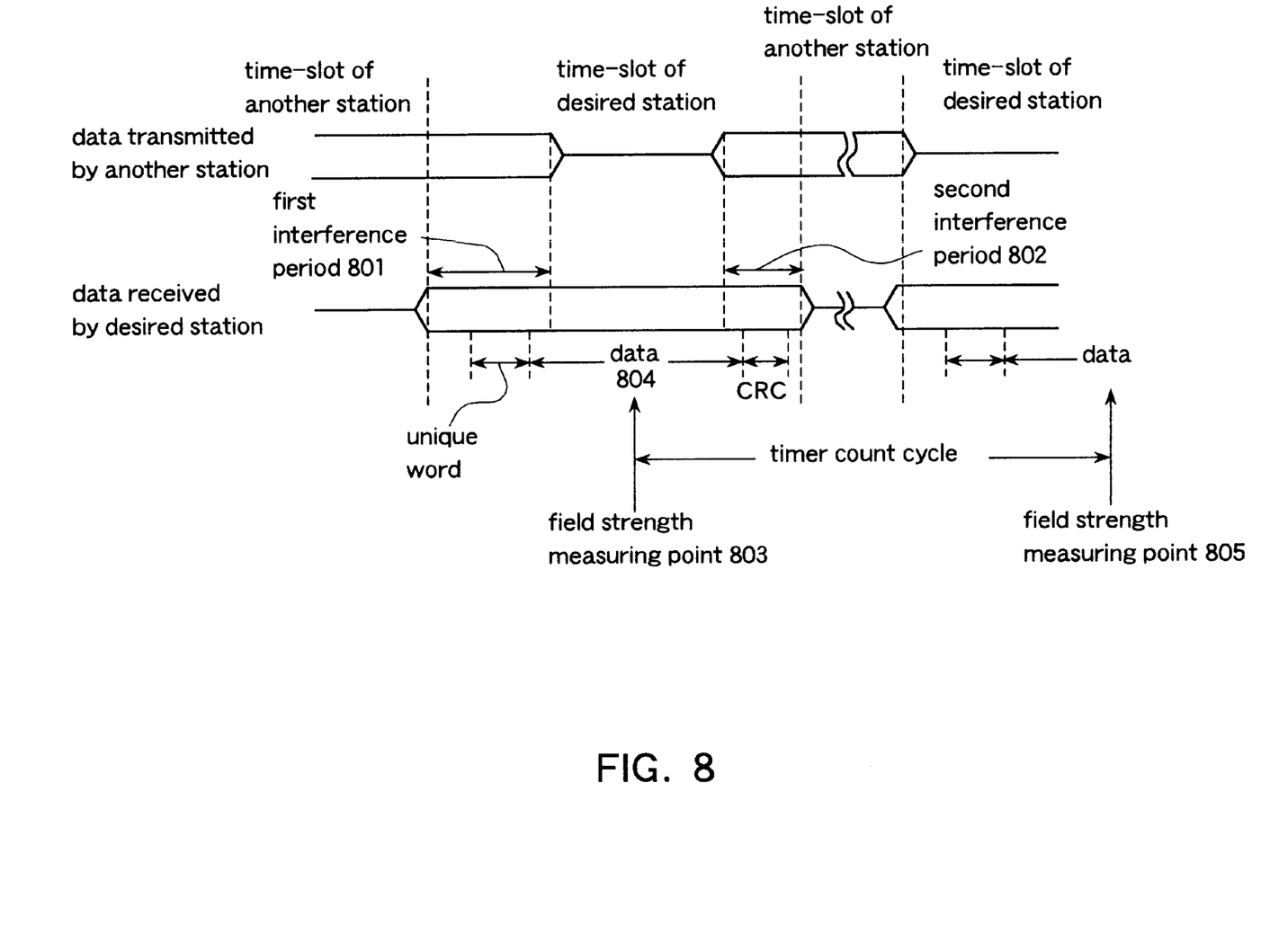
FIG. 8 is a timing chart showing an example of how data transmitted from another station interferes during the time-slot for the desired station.

FIG. 7 shows the configuration of a method for measuring the field strength of a received signal in time-division multiple access in accordance with a third embodiment of the present invention. FIG. 8 shows an example of how the data sent from another station interferes during the time-slot for the desired station. In FIG. 7, numeral 701 denotes a timer portion, numeral 702 denotes a field strength measuring portion, numeral 711 denotes a receive data processing path, numeral 712 denotes a field strength measurement timing signal, numeral 713 denotes a field strength measurement data signal, and numeral 714 denotes a reset signal. In FIG. 8, numeral 801 denotes a first interference period, numeral 802 denotes a second interference period, numeral 803 denotes the time when the field strength of the received signal is measured, numeral 804 denotes the data allocated to the desired station, and numeral 805 denotes the time when the field strength of the next received signal is measured during the next time-slot allocated to the desired station.

The received signal is passed over the receive data processing path 711 into the timer portion 701 and the field strength measuring portion 702. The timer portion 701 operates in synchronization with the received data, and counts the cycles from one time-slot for the desired station in the time-division multiple access to the next time-slot for the desired station.

If a reset signal 714 is supplied from outside to the timer portion 701 while data 804 is received during the time-slot for the desired station in FIG. 8, the timer is reset. At this time, the timer portion 701 outputs a field strength measurement timing signal 712 to notify the field strength measuring portion 702 of the timing for measuring the field strength. In FIG. 8, at the time 805 when the field strength of the next received signal is measured after one cycle, the another field strength measurement timing signal 712 is output, and the count is continued. The field strength measuring portion 702 measures the field strength of the received signal at the time when it receives the field strength measurement timing signal 712, and outputs the field strength measurement data signal 713.

The reset signal 714 can be supplied from, for example, a microprocessor which detects a period of data 804 based on the received signal. The microprocessor generates the reset signal at an arbitrary timing during the period of the data 804.

With this embodiment, even when there is a first interference period 801 and a second interference period 802 due to the interfering wave from another station as in FIG. 8, the field strength of the received data allocated to the desired station can be measured correctly, because the timer is reset in the period corresponding to the data 804 allocated to the desired station and the field strength of the received data is measured at a field strength measuring point 803. Furthermore, the timer portion 701 repeats the operation with a cycle corresponding to the period from one time-slot to the next time-slot for the desired station. Therefore, the field strength of the received data allocated to the desired station can be measured correctly even without applying a reset signal 714 from the next time on, because another field strength measurement timing signal 712 is output at a field strength measuring point 805, which is the time for measuring the field strength of the next received signal.

If the above first to third embodiments are combined so that the result of the detection of the unique word in the data received by the unique word detecting portion and the result of the CRC matching in the data received by the CRC calculating portion are evaluated by a microprocessor, the field strength can be measured in the slots for the desired station at arbitrary timing by resetting the timer which has been synchronized with the timing of the time-division multiplex slots, at the time when a measurement is desired. This is explained in the next embodiment.

Fourth Embodiment

Figure 9:
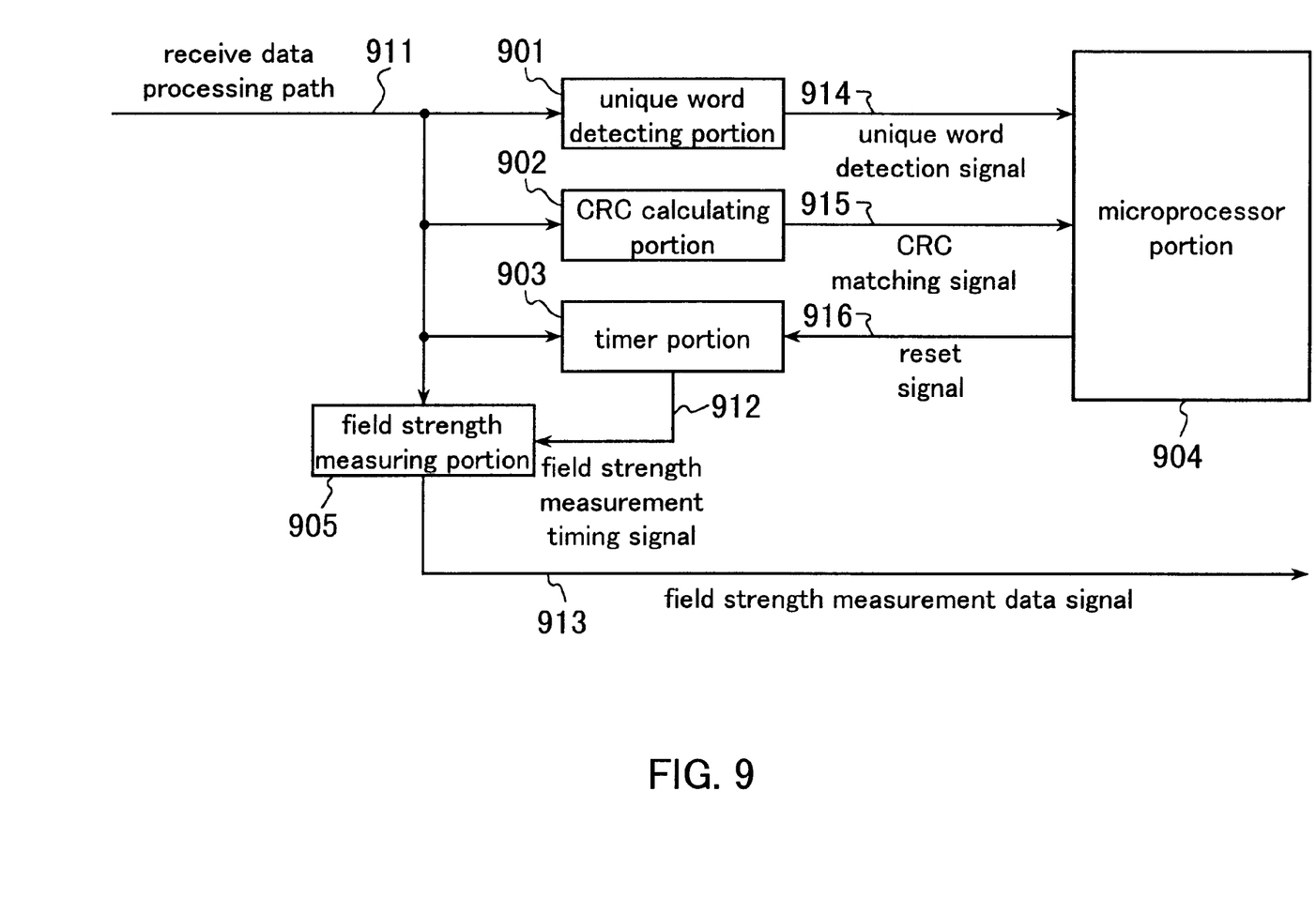
FIG. 9 is a block diagram illustrating a fourth embodiment of the present invention.

FIG. 9 shows the configuration of a method for measuring the field strength of a received signal in time-division multiple access in accordance with a fourth embodiment of the present invention. In FIG. 9, numeral 901 denotes a unique word detecting portion, numeral 902 denotes a CRC calculating portion, numeral 903 denotes a timer portion, numeral 904 denotes a microprocessor portion, and numeral 905 denotes a field strength measuring portion.

The received signal is passed over a receive data processing path 911 into the unique word detecting portion 901, the CRC calculating portion 902, the timer portion 903, and the field strength measuring portion 905. When the unique word detecting portion 901 detects a unique word in the received data, it gives out the unique word detection signal 914, which is transmitted to the microprocessor portion 904. When the CRC calculating portion 902 detects a CRC in the received data, it compares the internally calculated CRC with the CRC of the received data, and, if the two match, gives out the CRC matching signal 915, which is transmitted to the microprocessor portion 904.

The microprocessor portion 904 determines the current position in the received data on the basis of the unique word detection signal 914 and the CRC matching signal 915. That is, since a period of the data of a desired station is located between the unique word and the CRC, the microprocessor portion 904 can calculate the position of the data from the unique word detection signal 914 and the CRC matching signal 915. Thus the microprocessor portion 904 generates the reset signal 916 at an arbitrary timing during the period of the data and sends a reset signal 916 to the timer portion 903.

The reset signal 916 resets the timer of the timer portion 903, and at the same time causes the timer portion 912 to output a field strength measurement timing signal 912. After the timer has been reset by the reset signal 916, the timer portion 903 automatically keeps track of the data slot timing and outputs the field strength measurement timing signal 912 during the next time-slot for the desired station. The field strength measuring portion 905 measures the field strength of the received signal at the time when it receives the field strength measurement timing signal 912, and outputs the field strength measurement data signal 913.

With this embodiment, even when there is an interfering wave from another station during the unique word in the time-slot for the desired station, or when there is an interfering wave from another station during the CRC in the time-slot for the desired station, the field strength of the received data allocated to the desired station can be measured correctly. Moreover, the field strength of the received data allocated to the desired station can be measured correctly even without applying a reset signal 916 from the next time onward, because the timer portion 903 repeats the operation with a cycle corresponding to the period from one time-slot to the next time-slot for the desired station.

The following is an explanation of a device using this method for measuring field strength.

Fifth Embodiment

Figure 10:
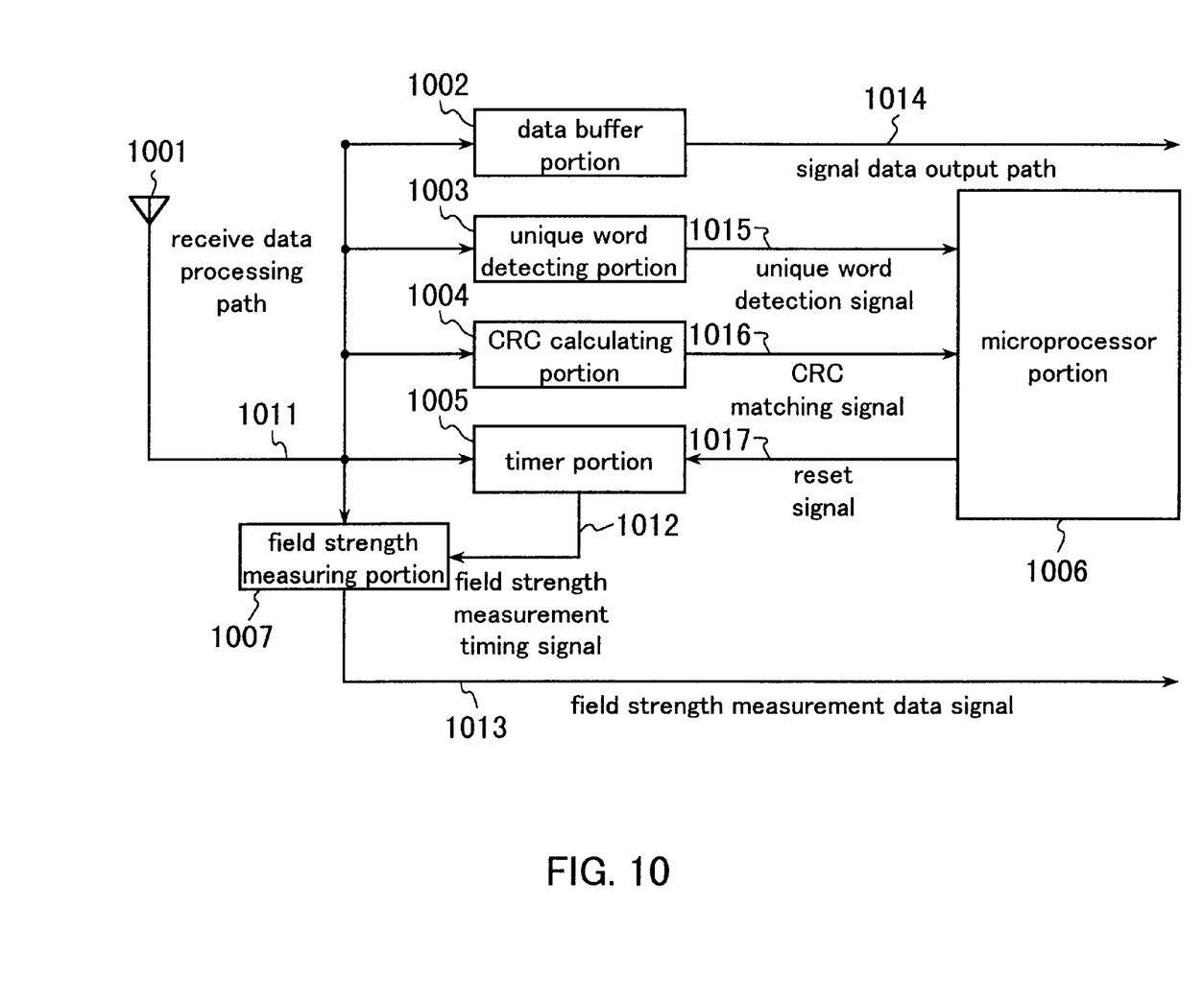
FIG. 10 is a block diagram illustrating a fifth embodiment of the present invention.

FIG. 10 shows the configuration of a receiving device for time-division multiple access according to a fifth embodiment of the present invention. This receiving device includes a receiving antenna 1001, a data buffer portion 1002, a unique word detecting portion 1003, a CRC calculating portion 1004, a timer portion 1005, a microprocessor portion 1006, and a field strength measuring portion 1007.

A signal that is received with the receiving antenna 1001 is simultaneously transmitted to the data buffer portion 1002, the unique word detecting portion 1003, the CRC calculating portion 1004, the timer portion 1005, and the field strength measuring portion 1007. When the unique word detecting portion 1003 detects a unique word in the received data, it gives out a unique word detection signal 1015, which is transmitted to the microprocessor portion 1006. When the CRC calculating portion 1004 detects a CRC in the received data, it compares the internally calculated CRC with the CRC of the received data, and, if the two match, gives out a CRC matching signal 1016, which is transmitted to the microprocessor portion 1006.

The microprocessor portion 1006 determines the current position in the received data on the basis of the unique word detection signal 1015 and the CRC matching signal 1016, and sends a reset signal 1017 to the timer portion 1005. This reset signal 1017 resets the timer of the timer portion 1005, and at the same time causes the timer portion 1005 to output a field strength measurement timing signal 1012. After the timer has been reset by the reset signal 1017, the timer portion 1005 automatically keeps track of the data slot timing and outputs the field strength measurement timing signal 1012 during the next time-slot for the desired station. The field strength measuring portion 1007 measures the field strength of the received signal at the time when it receives the field strength measurement timing signal 1012, and outputs the field strength measurement data signal 1013.

With the receiving device for time-division multiple access of this embodiment, even when there is an interfering wave from another station during the unique word of the time-slot for the desired station, or when there is an interfering wave from another station during the CRC of the time-slot for the desired station, the field strength of the received data allocated to the desired station can be measured correctly. Moreover, the field strength of the received data allocated to the desired station can be measured correctly even without applying a reset signal 1017 from the next time on, because the timer portion 1005 repeats the operation with a cycle corresponding to the period from one time-slot to the next time-slot for the desired station.

The receiving device of this embodiment is formed by incorporating a measuring device composed in accordance with the method of the fourth embodiment of the invention. Further, each of measuring devices composed in accordance with the methods of the first to third embodiments can be incorporated into a receiving device in a similar manner.

Sixth Embodiment

Figure 11:
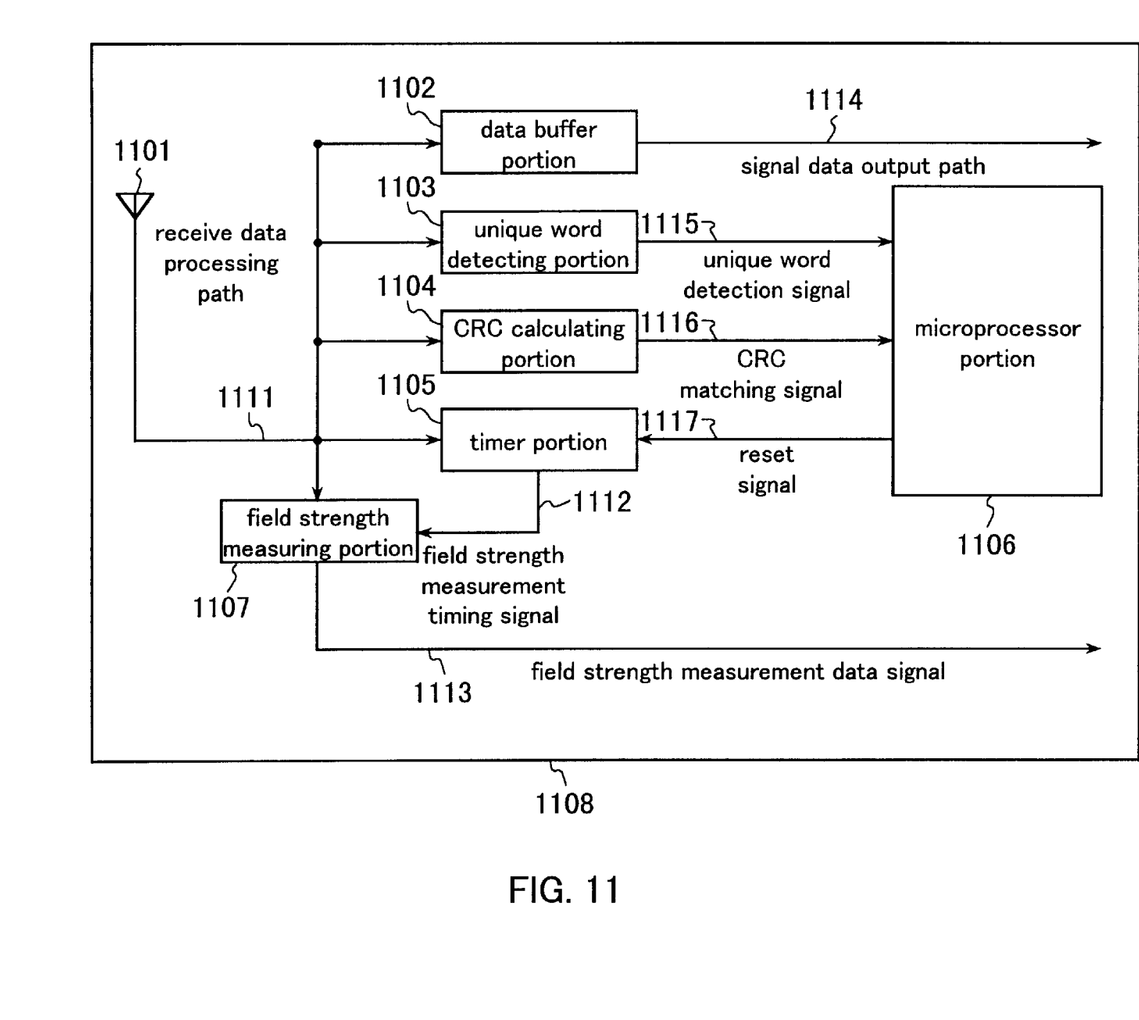
FIG. 11 is a block diagram illustrating a sixth embodiment of the present invention.

FIG. 11 shows the configuration of a mobile communication terminal according to a sixth embodiment of the present invention. This mobile communication terminal performs radio communication with a mobile communication base-station and includes a receiving device for time-division multiple access 1108 having a receiving antenna 1101, a data buffer portion 1102, a unique word detecting portion 1103, a CRC calculating portion 1104, a timer portion 1105, a microprocessor portion 1106, and a field strength measuring portion 1107.

A signal that is received with the receiving antenna 1101 is simultaneously transmitted to the data buffer portion 1102, the unique word detecting portion 1103, the CRC calculating portion 1104, the timer portion 1105, and the field strength measuring portion 1107. When the unique word detecting portion 1103 detects a unique word in the received data, it gives out a unique word detection signal 1115, which is transmitted to the microprocessor portion 1106. When the CRC calculating portion 1104 detects a CRC in the received data, it compares the internally calculated CRC with the CRC of the received data, and, if the two match, gives out a CRC matching signal 1116, which is transmitted to the microprocessor portion 1106.

The microprocessor portion 1106 determines the current position in the received data on the basis of the unique word detection signal 1115 and the CRC matching signal 1116, and sends a reset signal 1117 to the timer portion 1105. This reset signal 1117 resets the timer of the timer portion 1105, and at the same time causes the timer portion 1105 to output a field strength measurement timing signal 1112. After the timer has been reset by the reset signal 1117, the timer portion 1105 automatically keeps track of the data slot timing and outputs the field strength measurement timing signal 1112 during the next time-slot for the desired station. The field strength measuring portion 1107 measures the field strength of the received signal at the time when it receives the field strength measurement timing signal 1112, and outputs the field strength measurement data signal 1113.

With the mobile communication terminal of this embodiment, even when there is an interfering wave from another station during the unique word of the time-slot for the desired station, or when there is an interfering wave from another station during the CRC of the time-slot for the desired station, the field strength of the received data allocated to the desired station can be measured correctly. Moreover, the field strength of the received data allocated to the desired station can be measured correctly even without applying a reset signal 1117 from the next time on, because the timer portion 1105 repeats the operation with a cycle corresponding to the period from one time-slot to the next time-slot for the desired station.

The mobile communication terminal of this embodiment is formed by incorporating a measuring device composed in accordance with the method of the fourth embodiment of the invention. Further, each of measuring devices composed in accordance with the methods of the first to third embodiments can be incorporated into a mobile communication terminal in a similar manner.

Seventh Embodiment

Figure 12:
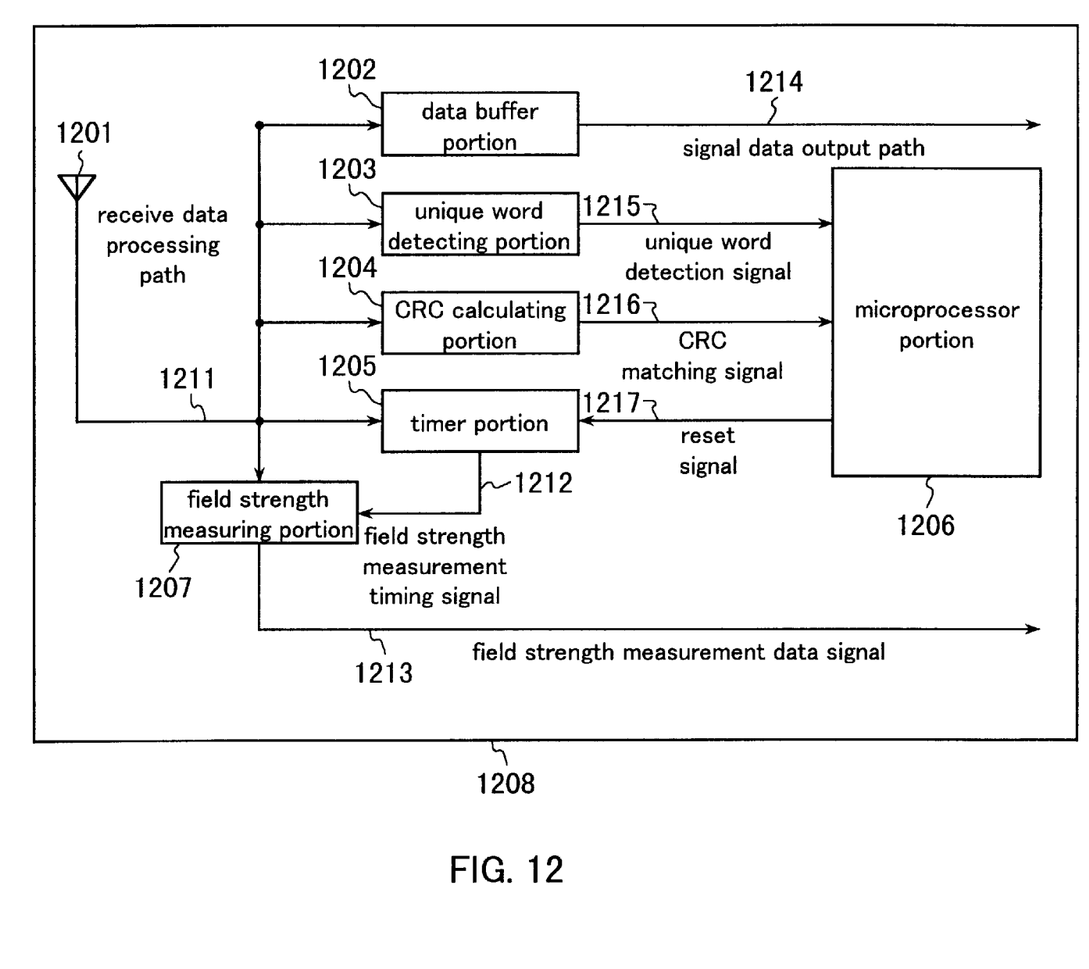
FIG. 12 is a block diagram illustrating a seventh embodiment of the present invention.

FIG. 12 shows the configuration of a mobile communication base-station according to a seventh embodiment of the present invention. This mobile communication base-station performs radio communication with a mobile communication terminal and includes a receiving device for time-division multiple access 1208 having a receiving antenna 1201, a data buffer portion 1202, a unique word detecting portion 1203, a CRC calculating portion 1204, a timer portion 1205, a microprocessor portion 1206, and a field strength measuring portion 1207.

A signal that is received with the receiving antenna 1201 is simultaneously transmitted to the data buffer portion 1202, the unique word detecting portion 1203, the CRC calculating portion 1204, the timer portion 1205, and the field strength measuring portion 1207. When the unique word detecting portion 1203 detects a unique word in the received data, it gives out a unique word detection signal 1215, which is transmitted to the microprocessor portion 1206. When the CRC calculating portion 1204 detects a CRC in the received data, it compares the internally calculated CRC with the CRC of the received data, and, if the two match, gives out a CRC matching signal 1216, which is transmitted to the microprocessor portion 1206.

The microprocessor portion 1206 determines the current position in the received data on the basis of the unique word detection signal 1215 and the CRC matching signal 1216, and sends a reset signal 1217 to the timer portion 1205. This reset signal 1217 resets the timer of the timer portion 1205, and at the same time causes the timer portion 1205 to output a field strength measurement timing signal 1212. After the timer has been reset by the reset signal 1217, the timer portion 1205 automatically keeps track of the data slot timing and outputs the field strength measurement timing signal 1212 during the next time-slot for the desired station. The field strength measuring portion 1207 measures the field strength of the received signal at the time when it receives the field strength measurement timing signal 1212, and outputs the field strength measurement data signal 1213.

With the mobile communication base-station of this embodiment, even when there is an interfering wave from another station during the unique word of the time-slot for the desired station, or when there is an interfering wave from another station during the CRC of the time-slot for the desired station, the field strength of the received data allocated to the desired station can be measured correctly. Moreover, the field strength of the received data allocated to the desired station can be measured correctly even without applying a reset signal 1217 from the next time on, because the timer portion 1205 repeats the operation with a cycle corresponding to the period from one time-slot to the next time-slot for the desired station.

The mobile communication base-station of this embodiment is formed by incorporating a measuring device composed in accordance with the method of the fourth embodiment of the invention. Further, each of measuring devices composed in accordance with the methods of the first to third embodiments can be incorporated into a mobile communication base-station in a similar manner.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for measuring field strength of a received signal in a time-division multiple access, wherein the signal is affected by interference from other stations using the same frequency carrier wave, the method comprising the steps of:

continuously timing a lapse of a period corresponding to an interval of time-slots for a desired station by a timer, which outputs a signal at every lapse of the period;

resetting the timer to restart the timing at an arbitrary time while data is received during the time-slot for the desired station;

measuring the field strength of the received signal at the time when the resetting step is performed; and repeating the measurement of the field strength of the received signal at every cycle of the time-slot, points of time for the measurement being determined in response to the output signal of the timer.

2. A method for measuring field strength of a received signal in a time-division multiple access, wherein the signal is affected by interference from other stations using the same frequency carrier wave, the method comprising the steps of:

detecting a unique word for a desired station in the received signal;

ascertaining a consistency of data of the received signal by calculating and evaluating CRC in the received signal;

continuously timing a lapse of a period corresponding to an interval of time-slots for a desired station by a timer, which outputs a signal at every lapse of the period;

determining a time for resetting the timer, based on the result of the detecting step and the ascertaining step;

resetting the timer to restart the timing at the time determined by the determining step;

measuring the field strength of the received signal at the time when the resetting step is performed; and repeating the measurement of the field strength of the received signal at every cycle of the time-slot, points of time for the measurement being determined in response to the output signal of the timer.

3. A device for measuring field strength of a received signal in a time-division multiple access, wherein the signal is affected by interference from other stations using the same frequency carrier wave, the method comprising:
- a timer for continuously timing a lapse of a period corresponding to an interval of time-slots for a desired station, the timer outputting a signal at every lapse of the period;
- resetting means for resetting the timer to restart the timing at an arbitrary time while data is received during a time-slot for desired station; and
- field strength measuring means for measuring the field strength of the received signal at the time when the resetting step is performed, the measurement being repeated at every cycle of the time-slot, points of time for the repeating measurement being determined in response to the output signal of the timer.

4. A device for measuring field strength of a received signal in a time-division multiple access, wherein the signal is affected by interference from other stations using the same frequency carrier wave, the method comprising:
- unique word detecting means for detecting a unique word for a desired station in the received signal;
- CRC calculating means for ascertaining consistency of data of the received signal by calculating and evaluating CRC in the received signal;
- a timer for continuously timing a lapse of a period corresponding to an interval of time-slots for a desired station, the timer outputting a signal at every lapse of the period;
- a microprocessor for resetting the timer to restart the timing at the time determined on the basis of the output signal of the unique word detecting means and the CRC calculating means; and
- field strength measuring means for measuring the field strength of the received signal at the time when the resetting step is performed, the measurement being repeated at every cycle of the time-slot, points of time for the repeating measurement being determined in response to the output signal of the timer.

5. A receiving device for time-division multiple access comprising: the device according to claim 3; and data buffer means.

6. A receiving device for time-division multiple access comprising: the device according to claim 4; and data buffer means.

7. A mobile communication terminal comprising the receiving device according to claim 5.

8. A mobile communication terminal comprising the receiving device according to claim 6.

9. A mobile communication base-station comprising the receiving device according to claim 5.

10. A mobile communication base-station comprising the receiving device according to claim 6.

* * * * *